July 2, 1940.  H. C. BOWEN  2,206,629
FLUID PRESSURE BRAKING SYSTEM
Filed March 1, 1939
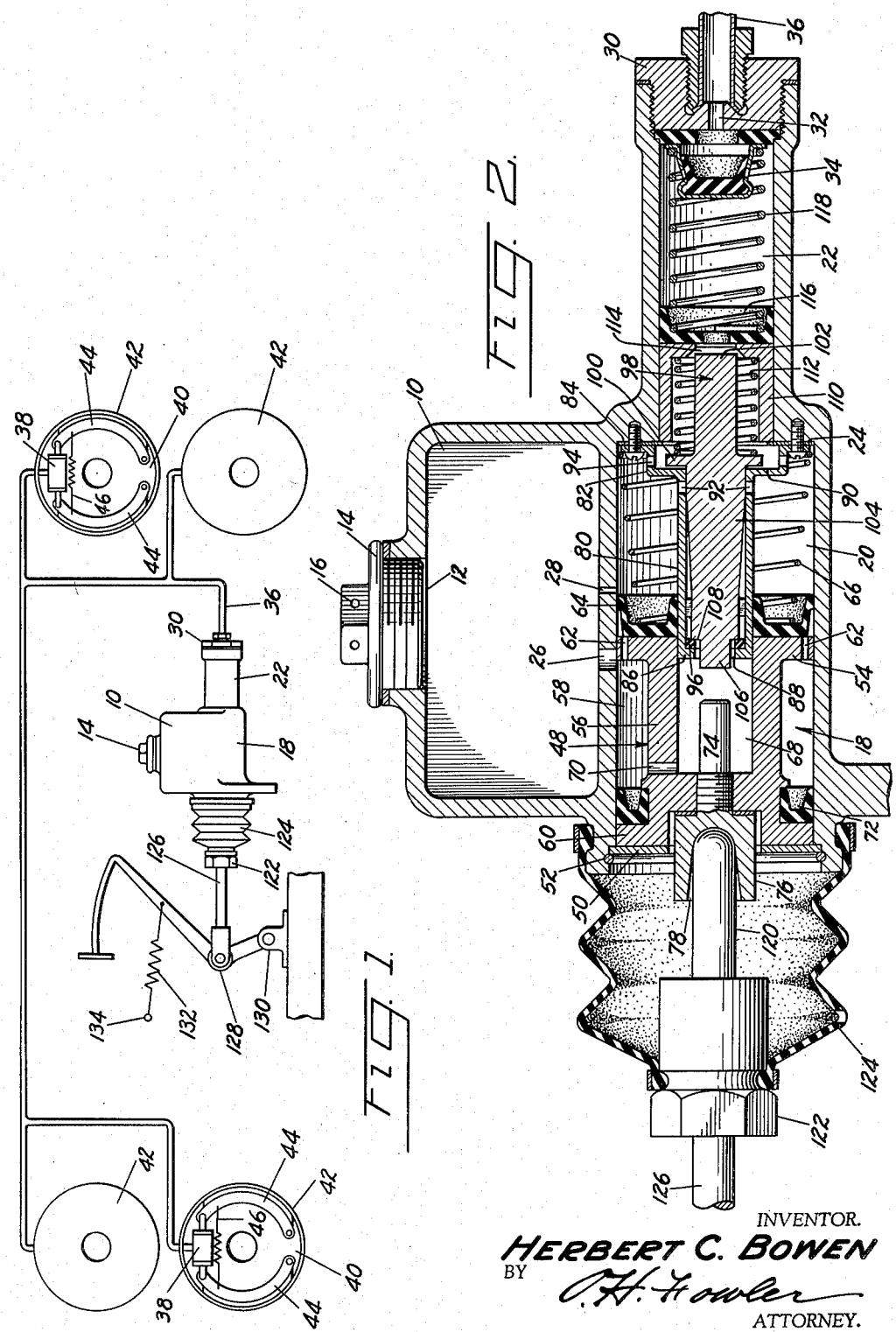
INVENTOR.
HERBERT C. BOWEN
BY C. H. Fowler
ATTORNEY.

Patented July 2, 1940

2,206,629

UNITED STATES PATENT OFFICE 2,206,629

FLUID PRESSURE BRAKING SYSTEM

Herbert C. Bowen, Detroit, Mich., assignor to Hydraulic Brake Company, Detroit, Mich., a corporation of California Application March 1, 1939, Serial No. 259,272

4 Claims. (Cl. 60—54.6)

This invention relates to fluid pressure braking systems, and more particularly to fluid pressure producing devices therefor.

The invention comprehends a fluid pressure producing device of the compound type including low pressure producing means and a high pressure producing means connected to a braking system, and means operative upon a predetermined movement of the low pressure producing means for transferring the load or pressure from the low pressure producing means to the high pressure producing means.

An object of the invention is to provide a fluid pressure producing device of the compound type operative to effect a transition from low to high pressure in such a manner that the transition will not be perceptible to the operator.

Another object of the invention is to provide a fluid pressure producing device of the compound type including means for reducing the pressure in one chamber while increasing the pressure in another chamber.

Other objects of the invention will appear from the following description taken in connection with the drawing forming a part of this specification, and in which—

Fig. 1 is a schematic view of a braking system embodying the invention; and

Fig. 2 is a vertical sectional view of the fluid pressure producing device.

Referring to the drawing for more specific details of the invention, 10 represents a fluid reservoir having a filling opening 12 normally closed as by a plug 14 having openings 16 for venting the reservoir to the atmosphere. A cylinder 18 at the base of the reservoir includes a large chamber 20 and a relatively small chamber 22 arranged concentrically to, in direct communication with, and forward of the large chamber, and providing at its junction therewith an annular shoulder 24.

The large chamber 20 has a port 26 providing a communication between the chamber and the reservoir, and a relatively small port 28 also providing a communication between the chamber and the reservoir. The former is known in the art as a supply port, and the latter is generally referred to as a compensating port. The small cylinder 22 has a head 30 provided with a discharge port 32 controlled as by a two-way valve 34.

A fluid pressure delivery pipe or conduit 36 suitably connected to the discharge port 30 has branches connected respectively to fluid pressure actuated motors 38 preferably arranged in pairs, one pair for actuating brakes associated with the front wheels of a vehicle, and another pair for actuating brakes associated with the rear wheels of the vehicle.

As shown, the brakes are of conventional type each including a fixed support or backing plate 40, adapted to be secured to an axle or to an axle housing, a rotatable drum 42 associated with the backing plate and adapted to be secured to a wheel, a pair of corresponding friction elements or shoes 44 mounted on the backing plate for cooperation with the drum, a retractile spring 46 connecting the shoes, and a motor corresponding to the motors 38 mounted on the backing plate between the shoes and operative to actuate the shoes into engagement with the drum against the resistance of the retractile spring.

A piston 48 reciprocable in the large chamber 20 is held against displacement by a washer 50 seated on an annular shoulder in the wall of the cylinder 20 adjacent the open end thereof and secured in place by a retaining ring 52 fitted in a groove in the wall of the cylinder. The piston 48 includes a head 54, a reduced body portion 56 providing in conjunction with the cylinder an annular chamber 58 communicating with the reservoir by way of the port 26, and a skirt 60.

The head 54 of the piston has a plurality of spaced passages 62 therethrough providing communications between the annular chamber 58 and that portion of the cylinder forward of the piston, and a collapsible sealing cup 64 seated on the head for control of the passages is held against displacement as by a spring 66 interposed between the cup and the annular shoulder 24 at the junction of the large and small chambers. The spring 66 also serves to return the piston 48 to its retracted position.

The body portion 56 of the piston is axially bored to provide a chamber 68 communicating with the annular chamber 58 by way of a port 70 in the wall of the body portion. The skirt 60 of the piston has seated thereon a sealing cup 72 for guarding against seepage of fluid from the cylinder past the piston, and suitably mounted in the back of the piston is a thrust pin 74 extending well into the chamber 68, and the pin 74 has a large head 76 provided with a recess or socket 78, the purpose of which will hereinafter appear.

A sleeve 80 has on one of its ends a portion 82 of increased diameter provided with a flange 84, and its other end is closed as by a head 86 provided with a port 88. The flange 84 is seated upon and fixedly secured to the annular shoulder 24 so as to support the sleeve concentrically of the cylinder with that end of the sleeve having the head 86 extending through the flexible cup 64 and received by the chamber 68 in the body of the piston 48. The sleeve 80 has an internal annular shoulder 90, and arranged in the wall of the sleeve adjacent this shoulder is a plurality of spaced ports 92 and also a plurality of spaced ports 94. These ports provide communications between the sleeve and the chamber 20 of the cylinder, and seated on the head 86 of the sleeve within the sleeve is a sealing ring 96.

A plunger 98 reciprocable in the sleeve 80 has a flange 100 normally seated on the annular shoulder 90 of the sleeve, and a head 102 extended concentrically into the small chamber 22. The body portion of the plunger back of the flange 100 is tapered to provide a metering pin 104 for cooperation with the passages 92, and the free end of the pin has a reduced portion 106 extended through the port 88 in the head 86 of the sleeve and providing an annular shoulder 108 adapted to seat on the sealing ring 96.

A hollow piston 110 reciprocable in the chamber 22 is seated on a spring 112 interposed between the back of the head of the piston and the flange 100 on the plunger. The piston 110 has a port 114 through its head adapted to receive the head of the plunger, and seated on the head of the piston is a sealing cup 116 held against displacement by a spring 118 interposed between the cup and the valve 34. The spring 118 also serves to return the piston 110 to its retracted position.

A thrust pin 120 has one of its ends seated in the socket 78, and secured to its other end is a coupling 122 connected by a flexible boot 124 to the open end of the cylinder for the exclusion of dust and other foreign substances from the cylinder. The coupling 122 is connected by a rod 126 to a foot pedal lever 128 pivotally mounted on a bracket 130 and connected by a retractile spring 132 to a fixed support 134.

In operation, upon depressing the foot pedal lever 128, force is transmitted therefrom through the rod 126 and thrust pin 120 to the piston 48, resulting in moving the piston on its compression stroke. During the initial movement of the piston, the sealing cup 64 covers the port 28, and, thereafter, as the piston advances, the fluid in the large chamber 20 is displaced therefrom through the passages 94 into that portion of the sleeve 80 having the larger diameter, thence through the hollow piston 110, the port 114 in the head thereof, into that portion of the chamber 22 forward of the piston 110, thence past the two-way valve 34, through the discharge port 32 and fluid pressure delivery pipe 36 into the fluid pressure actuated motors 38, causing energization of the motors and resulting in actuation of the friction elements 44 into engagement with the drums 42 against the resistance of the retractile springs 46.

At the conclusion of this operation, the piston 48 has traveled sufficiently to engage the thrust pin 74, carried thereby, with the free end 106 of the metering pin 104 and to advance the plunger 98 sufficiently for the head 102 thereof to enter and close the port 114 in the head of the piston 110. Thereafter, the pistons 48 and 110 move as a single unit.

Simultaneously with the closing of the port 114 in the head of the piston 110, the pressure on the fluid in the system is transferred from the piston 48 to the piston 110, and as the pistons advance the metering pin 104 cooperating with the passages 92 provides for a gradual displacement of the fluid in the cylinder forward of the piston 48, through the passages 92 into the sleeve 80, thence through the port 88 in the head of the sleeve into the chamber 68 in the body of the piston 48, thence through the port 70 into the annular chamber, and thence through the port 26 into the reservoir.

Upon release of the applied force, the foot pedal lever 128 is returned to its retracted position under the influence of the retractile spring 132, and carries with it the rod 126 and thrust pin 120. This results in release of the pistons 48 and 110 and the return of the pistons to their retracted positions under the influence of the springs 66 and 118.

Because of a differential in the load on the springs 66 and 118, the piston 48 returns to its retracted position slightly in advance of the piston 110, and as the piston 48 returns to its retracted position, a partial vacuum is created in the cylinder, resulting in drawing fluid from the reservoir through the port 26 into the annular chamber 58, thence through the passages 62 in the head of the piston 48, past the sealing cup 64 into that portion of the cylinder forward of the piston.

As the piston 110 moves to its retracted position, the plunger 98 is moved to its retracted position under the influence of the spring 112. This results in opening the port 114 in the head of the piston and establishing communication between the chambers 20 and 22 by way of the hollow piston 110, the sleeve 80, and the ports 94.

Simultaneously with the movement of the pistons 48 and 110 to their retracted positions, fluid is returned to the chamber 22 from the motors 38 and the fluid pressure delivery pipes connecting the motors to the cylinder. Under this condition the fluid received by the chambers 20 and 22 is in excess of the quantity necessary to completely fill the chambers, and the excess fluid is displaced from the chambers through the port 28 into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A fluid pressure producing device comprising a reservoir, a cylinder associated therewith including a large chamber communicating with the reservoir and a small chamber, a piston reciprocable in the large chamber, a piston reciprocable in the small chamber having a passage therethrough, a sleeve intermediate the pistons having an orifice communicating with the large chamber, and a metering pin reciprocable in the sleeve for control of the passage and orifice.

2. A fluid pressure producing device comprising a reservoir, a cylinder associated therewith including a large chamber communicating with the reservoir and a small chamber, a piston reciprocable in the large chamber having a concentric chamber communicating with the large chamber, a piston reciprocable in the small chamber having a passage therethrough, a sleeve intermediate the pistons communicating with the chambers, and a metering pin in the sleeve actuated by the piston in the large chamber for control of the communications.

3. A fluid pressure producing device comprising a reservoir, a cylinder associated therewith including a large chamber communicating with the reservoir and a small chamber, a large piston reciprocable in the large chamber having a passage therethrough, a small piston reciprocable in the small chamber having a passage therethrough, a sleeve supported in the large chamber received by the passage in the large piston and providing communication between the large chamber and the passage in the large piston, and a metering pin in the sleeve adapted to be actuated by the large piston for control of the passages and communications.

4. A fluid pressure producing device comprising a reservoir, a cylinder associated therewith including a large chamber communicating with the reservoir and a small chamber arranged concentric to and forward of the large chamber and providing at its junction therewith an annular shoulder, a sleeve supported on the shoulder extending concentrically into the large chamber having openings in its wall providing communications between the sleeve and the large chamber, a piston reciprocable in the large chamber having a concentric passage receiving the sleeve and a port providing a communication between the concentric passage and the large chamber, a piston reciprocable in the small chamber having a passage therethrough, and a metering pin in the sleeve actuated by the piston in the large chamber for control of the passages and communications.

HERBERT C. BOWEN.